United States Patent Office 3,808,300
Patented Apr. 30, 1974

3,808,300
PROCESS FOR THE PREPARATION OF CLOSED-CELLULAR SHAPED PRODUCTS OF OLEFIN POLYMERS USING A MIXTURE OF A CITRIC ACID SALT AND A CARBONATE OR BICARBONATE AS THE NUCLEATION AGENT
Akira Miyamoto, Hiroyuki Akiyama, and Yasuo Usuda, Hiratsuka-shi, Japan, assignors to Japan Gas-Chemical Company, Inc., Tokyo, Japan
Filed Apr. 19, 1968, Ser. No. 722,721
Claims priority, application Japan, Apr. 24, 1967, 42/26,167
Int. Cl. B29d 7/02, 27/00
U.S. Cl. 264—53      9 Claims

ABSTRACT OF THE DISCLOSURE

Process for preparing closed-cellular foamed articles having high degrees of expansion, of polyolefin which comprises supplying polyolefin into an extruder, heating and melting the polyolefin in the extruder, mixing a pressurized foaming agent normally gaseous or liquid with the melt, cooling the blend in the extruder to temperatures of a specific range lower than the melting point of the polyolefin and extruding the blend from the extruder into a low pressure zone.

---

Figure 1:
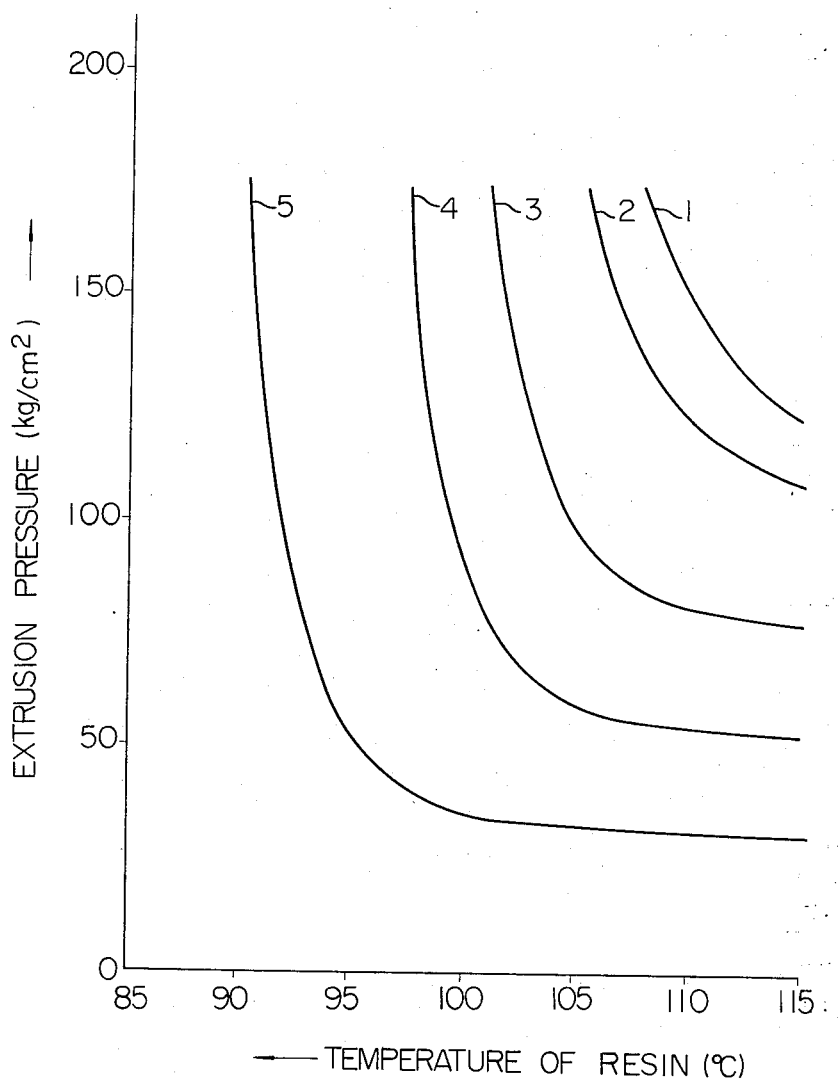

This invention relates to a process for the preparation of substantially closed-cellular shaped products of olefin polymers.

More particularly, the invention relates to a process for the preparation of foamed products of crystalline, substantially linear polymer or polymers, at least 80 mol percent of the monomer units of which being at least one olefin of 2–6 carbons.

Polyolefins are suitable for wide range of applications based on their excellent chemical, physical and electrical properties. Whereas, their utility can be still expanded if multifoamed polyolefins in sheet or other forms which are imparted elasticity and heat-insulating property while retaining the advantageous properties of polyolefins, can be prepared by simple means at low cost.

According to the conventional arts, chemicals which decompose at high temperatures and generate gas, such as azobisisobutyronitrile or P,P'-hydroxybisbenzenesulfonyl hydrazid are added as the chief foaming agent to polyolefins, and the mixtures are extruded. However, the resultant multifoamed polyolefins have high densities, and exhibit such drawbacks as offensive odor of the foaming agent or objectionable coloration.

Another known process for the preparation of foamed product comprises causing the starting material to absorb the optionally pressurized gas or low boiling point liquid and removing the pressure at high temperatures to gasify the latter. However, when this process is applied to polyolefins, the product foams have coarse and non-uniform cells, and also high density.

Again, there is a process proposed in which multifoamed polyethylene product was produced by extrusion, with the concurrent use of a chemical foaming agent, such as azobisisobutyronitrile, and an aliphatic hydrocarbon boiling at 30–70° C. But the products invariably have relatively high densities such as 0.3–0.5 g./cc.

On the other hand, for the preparation of polyolefin foams of high degree of expansion, conventionally polyolefins containing foaming agents are irradiated, or treated with organic peroxides so as to cause cross-linkages among the polyolefin molecules and to change the fluidity of the molten polyolefins, in advance of the foaming treatment. Preparation of multifoamed polyolefins by such means is introduced in numbers of literatures, for instance, in U.S. Pat. No. 2,948,665. However, the process has such deficiencies as that, the complex procedures make the continuous operation difficult, an irradiation equipment which is normally not so easy to handling is required, and that the scraps cannot be recovered for further use due to the crosslinking treatment. Consequently, the products are costly.

U.S. Pat. No. 3,067,147 teaches a process for the preparation of foamed polyolefins of high degree of expansion without the crosslinking treatment, using 1,2-dichlorotetrafluoroethane which is a special solvent as the foaming agent. The drawback of the process resides in the use of expensive foaming agent.

The object of the invention is to provide a process for the preparation of excellent polyolefin foams of low density which contain uniform and fine, substantially closed cells, by simple means without crosslinking polyolefins.

Another object of the invention is to provide an economical process for the preparation of shaped products of polyolefin foams of high degree of expansion, using cheap foaming agents. Other objects and advantages of the invention will become apparent from the following detailed disclosures.

The foregoing objects of the invention are accomplished by the process comprising supplying a crystalline, substantially linear polymer containing at least 80 mol percent of monomer units of at least one olefin of 2–6 carbon atoms into a melt extruder, heating and melting the polymer in the extruder, feeding a pressurized foaming agent into the polymer-melting zone of the extruder at a ratio of 2–50 parts by weight per 100 parts by weight of the polymer, the foaming agent being an organic compound selected from the group consisting of hydrocarbons, ethers, ketones, esters and chlorinated hydrocarbons, which are normally gaseous or liquid and boiling at temperatures ranging from $-45°$ C. to $+70°$ C., then cooling the blend of the polymer and the foaming agent in the extruder to the below-specified temperature range, viz., (a) temperatures lower than the melting point of the polymer by at least 2° C., and
(b) temperature not lower than the temperature at which $-dP/dT$ becomes 20 (kg./cm.$^2$ ° C.), in $-dP/dT$, T being the temperature (° C.) of the blend at the extruding die of the extruder, and P being the extruding pressure (kg./cm.$^2$) of the blend at the said die, and thereafter extruding the blend from the extruder into a low pressure zone.

Normally, in order to produce a closed-cellular product of high degree of expansion by extruding a pressurized and molten thermoplastic resin containing a foaming agent into a low pressure zone, the foaming must be performed at the state in which the resin has the viscoelastic fluidity suitable for preventing the escape of the generated gas to outside of the system. Again, since the time lapse between the generation of gas and completion of the cellular structure is approximately 0.5–2 seconds, the resin must solidify and acquire the rigidity to withstand the expansion pressure of the gas within that short time. Otherwise, the cell membranes are broken and shrunk, and products of high degree of expansion cannot be obtained.

Whereas, polyolefins have little fluidity at temperatures below their melting points due to the high crystallinity, but exceeding the melting points, they rapidly become easy-flowable. Accordingly, the temperature range at which each polyolefin exhibits visco-elastic fluidity suited for foaming is very narrow, and therefore it is extremely difficult to maintain the temperature suitable for foaming at the time of foaming. Furthermore, because polyolefins evolve large quantities of heat of crystallization at their transition from melt to solid, it is difficult to solidify them rapidly. Due to the foregoing reasons, polyolefin foams of high degree of expansion, e.g., of low density, are hard to obtain, while polystyrene foams of low density can be readily obtained.

We have engaged in extensive researches on the flowing behaviors of molten polyolefins containing foaming agents, and discovered that polyolefins containing foaming agents exhibit the fluidity sufficient for extruding operation at temperatures below the melting points of the polyolefins (polyolefins containing no foaming agent). Furthermore, we discovered that when the pressure is removed while the system is maintained at a specific temperature range below the melting point of the polyolefin employed, simultaneously with the gasification of the foaming agent, the polyolefin is hardened instantaneously to prevent escape of the gas, and thus excellent foamed product of high degree of expansion can be obtained. Based on the foregoing discoveries, we now have completed the process of the subject invention.

Hereinafter the correlation between the flowing behaviors of a molten polyolefin containing a foaming agent and the characteristics of the invention will be explained with reference to the attached drawings.

In the attached drawings, FIG. 1 shows the curves indicating the correlations of the extrusion temperature (° C.) at the extruding die of a resin containing a foaming agent at various concentrations, versus extruding pressure (kg./cm.$^2$) of the resin compositions at the die, measured as to a low density polyethylene-butane blend, the latter being the foaming agent.

Figure 2:
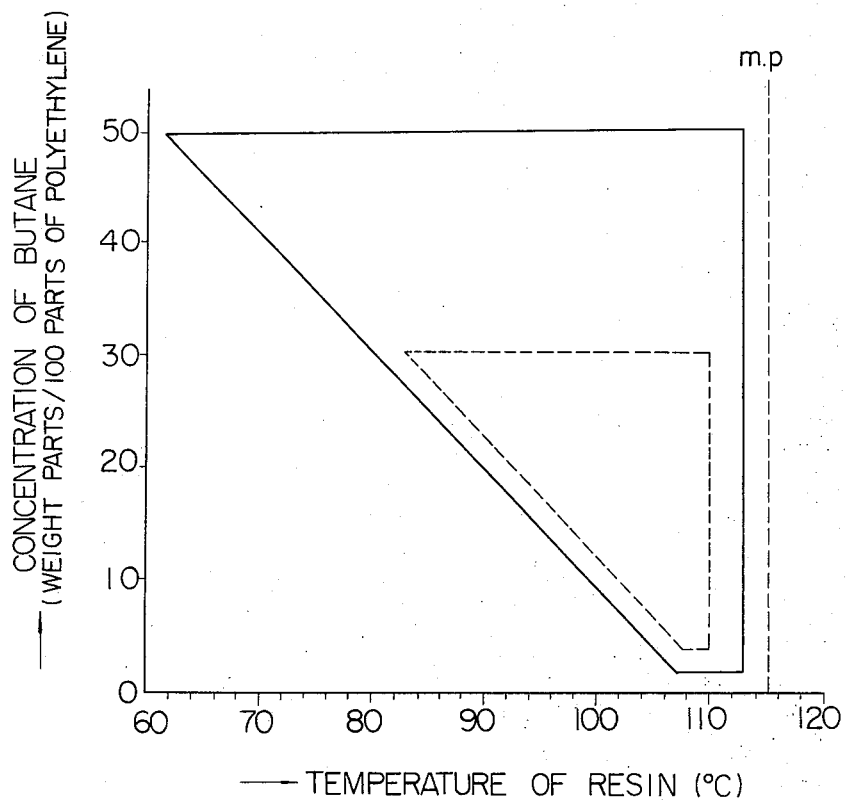

FIG. 2 shows the curves indicating each the correlation of the butane concentration versus the operable extrusion temperature range of the resin composition at the extruding die, and also the preferred range, in accordance with the subject invention. The data were measured as to the same composition employed for the preparation of FIG. 1.

Variation in fluidity of a molten polyolefin containing a foaming agent due to temperature change is illustrated in FIG. 1. For this purpose, a low density polyethylene having a melt index of 0.3 and a melting point of 115° C. which contains butane (mixture of 70% of n-butane and 30% of iso-butane) as the foaming agent was selected as a typical starting material, and the correlation of the foaming agent-containing polyethylene temperature (° C.) at the extruding die of the extruder, versus the extruding pressure (kg./cm.$^2$) of the same polyethylene composition at the said die, is illustrated by the curves (which are hereinafter referred to as the fluidity curves) in FIG. 1. The measurements were performed as follows. In an extruder of 45 mm. in diameter which is provided with a circular die, the above polyethylene was temporarily heated to 200° C. and melted. To the melt, each prescribed quantity of the above-mentioned butane mixture was injected, and the composition was extruded at the discharge rate of 6.0 kg./hr. The quantity of butane was varied to be 0, 3.0, 6.5, 12.0, and 18.5 parts by weight, per 100 parts by weight of the polyethylene in each run, and the correlation of the resin-extrusion temperature versus the extrusion pressure of the runs are indicated by the curves 1, 2, 3, 4, and 5, respectively. Generally, polyethylene exhibits little melt viscosity variation at temperatures above its melting point, and the viscosities are also low. Whereas, at temperatures below the melting point, crystallization progresses and the fluidity decreases rapidly. Accordingly, when polyethylene is extruded from an extruder, at temperatures below its melting point, the die pressure shows abrupt rise as illustrated in FIG. 1 (curve 1). In contrast, when a foaming agent is blended with the polyethylene, the composition shows remarkable fluidity at temperatures lower than the melting point of the polyethylene, and the abrupt rise in the extruding pressure takes place at a temperature considerably below the said melting point.

When a polyethylene containing a foaming agent is extruded into a low temperature-low pressure zone such as a normal room of atmospheric pressure, at temperatures lower than the melting point of polyethylene but higher than the point at which the temperature dependency of the extruding pressure becomes exceedingly great, the foaming agent is rapidly freed from the polyethylene and evaporates. Simultaneously crystallization of the polyethylene progresses because the temperature is below melting point of the polyethylene, and the fluidity thereof decreases. Furthermore, due to the heat of vaporization, the polyethylene is cooled, and its fluidity is still more reduced. Consequently the break of cell membranes by the pressure of the vaporized foaming agent is prevented, and cellular product of a high degree of expansion can be obtained.

FIG. 1 furthermore clearly indicates that the greater the content of the foaming agent, the greater the temperature difference between the temperature at which the abrupt rise in the extruding pressure takes place and the melting point of polyethylene per se. We discovered that such increase in fluidity of molten polyolefin caused by the addition of a foaming agent is a phenomenon observable not only in polyethylene-butane system, but generally in the systems comprising the foaming agents of the invention as specified in the foregoing, and crystalline, substantially linear polymers containing at least 80 mol percent of monomer units of at least one olefin of 2 to 6 carbons (hereinafter the polymers will be referred to simply as olefin polymers in this specification). This phenomenon is presumably caused by the mechanism in that the molecules of the low molecular foaming agent enter into the inter-molecular spaces of the high molecular olefin polymer to weaken the inter-molecular bonding strength of the latter and to increase the fluidity of the olefin polymer molecules as well as to retard their crystallization.

The process of this invention comprises cooling in the extruder a molten olefin polymer containing the foaming agent specified in the above at a ratio of 2 to 50 parts by weight of the latter per 100 parts by weight of the olefin polymer, to an optional temperature within a range lower than the melting point of the polymer by at least 2° C. and higher than the temperature at which the value of $-dP/dT$ as to the curve showing the correlation between the extruding pressure and the resin extrusion temperature becomes 20 (kg./cm.$^2 \cdot$ ° C.), and thereafter extruding the olefin polymer composition from the extruder into a low pressure (e.g. atmospheric pressure) zone. Thus foamed products of high degree of expansion and of densities ranging 0.3–0.02 g./cc., containing uniform and fine cells are prepared.

In the above cooling, the preferred temperature range of the olefin polymer composition lies between the temperature lower than the melting point of the polymer by at least 5° C., and the temperature higher than the temperature at which $-dP/dT$ becomes 20 (kg./cm.$^2 \cdot$ ° C.) by at least 2° C. The preferred ratio of foaming agent and the molten olefin polymer lies 4 to 30 parts by weight of the former per 100 parts by weight of the olefin polymer.

As to the system of the polyethylene and n-butane-isobutan mixture which is an embodiment of the invention, the correlation of the resin extrusion temperature range at the extruding die at which the foaming is possible in accordance with the invention, versus the content of the foaming agent is determined from the results of the experiments for FIG. 1, and illustrated in FIG. 2 with real line, whereas the correlation of the preferred temperature range of the resin at the extruding die suitable for foaming and the content of the foaming agent is indicated with dotted line. These temperature ranges can be easily determined by any expert skilled in the art who reads the foregoing detailed explanations.

The critical feature of the invention resides in the cooling of the molten olefin polymer which contains a foaming agent, to an optional temperature within a range which is lower than the melting point of the polymer by at least 2° C., and is higher than the temperature at which −dP/dT becomes 20 (kg./cm.$^2\cdot$°C.). Presumably the molten olefin polymer assumes a somewhat supercooled state upon such cooling, but by the removal of the pressure therefrom realized by extrusion into a low pressure zone, the low molecular foaming agent which has been present in the inter-molecular spaces of the olefin polymer is expelled from the system and gasified. Whereby a rapid transition of the flow property from the fluidity curve of the system of high foaming agent content to that of the system of very low foaming agent content takes place. As the result, remarkable loss in the fluidity is observed. Simultaneously, because the heat of vaporization is consumed by the gasification of the foaming agent, the olefin polymer is further cooled. The effect of this secondary cooling is superposed on the above transition effect, markedly accelerating the rate of solidification of the olefin polymer. Thus it is possible for the membranes separating the cells to instantaneously acquire the rigidity sufficient to entrap the generated gas.

The characteristics of our process is derived chiefly from the abrupt transition from the fluidity curve of the system of high foaming agent content to that of the system of extremely low foaming agent content, as above-described. Therefore, it is essential to cool the molten olefin polymer containing a foaming agent to a temperature lower than the melting point of the polymer itself by certain specific degrees. As illustrated in the later described examples, when the cooling is performed only to the melting point, satisfactory foamed product cannot be obtained. This critical feature is novel and has never been suggested in any known preparation processes of polyolefin foams.

In supplying the polymer to the extruder in accordance with the invention, it is strongly recommendable to feed a nucleating agent to the extruder, either as blended with the polymer or separately from the polymer. The addition of a nucleating agent serves to uniformize and reduce the size of cells, and to improve the whiteness, pliability, and appearance of the products.

Hereinafter the process of the invention will be explained with reference to preferred embodiment. To 100 parts by weight of an olefin polymer, 0.05–2.0 parts of a mixture consisting of a monoalkali salt of citric acid and a carbonate and/or a bicarbonate is added as the nucleating agent. The agent is caused to uniformly adhere onto the surfaces of the olefin polymer grains by blending in a ribbon blender or V-shaped blender, or by any other suitable means. Then the composition is fed into the extruder, and in which heated temporarily to a temperature above the melting point of the olefin polymer. Thus the olefin polymer is melted and the components of the nucleating agent reacted to supply carbon dioxide and water which serve as the nuclei of foams. Then through the small holes bored in the barrel of the extruder, 2–50 parts by weight of a foaming agent which is normally gaseous or liquid is fed into the system. During the subsequent mixing, a cooling medium composed of water or oil is circulated through the jacket provided outside the extruder barrel, in order to cool the molten gel composition in the extruder to a temperature lower than the melting point of the olefin polymer by 2° C. Thereafter the gel composition is continuously extruded into an atmosphere of normal pressure through a T-shaped die, a circular die, or the other modified die which is attached at the end of the extruder. Thus multifoamed polyolefin products having densities of 0.3–0.02 g./cc. and containing uniform and fine foams are continuously obtained, in the forms such as sheet, rod, or cylinder.

"Olefin polymers" said in this invention include all of the following groups:

(a) crystalline, substantially linear homopolymers of α-olefins of 2–6 carbons such as ethylene, propylene, 1-butene, 2-butene, 1-pentene, and 4-methyl-1-pentene;

(b) crystalline and substantially linear copolymers of at least two of the above α-olefins;

(c) crystalline and substantially linear copolymers of the α-olefins and other polymerizable, unsaturated compounds such as vinyl acetate, methyl methacrylate, vinyl chloride, styrene, acrylonitrile, etc., the α-olefin content of monomer units of each copolymer being at 80 mol percent;

(d) blends of above (a) and (b);

(e) blends of above (a) or (b) with (c), the α-olefin content of monomer units of each blend being at least 80 mol percent;

(f) blend compositions comprising at least one of the above (a), (b), and (c) and synthetic rubber such as butadiene rubber and butyl rubber, or natural rubber, the α-olefin content of monomer units of each blend composition being at least 80 mol percent.

The foaming agent employed in this invention is an organic compound boiling at −45°–+70° C., which is normally gaseous or liquid. The compounds useful as the foaming agent include, for example, saturated hydrocarbons such as propane, n-butane, iso-butane, cyclopropane and cyclobutane; unsaturated hydrocarbons such as butene, isobutylene, and butadiene; aliphatic ethers such as dimethyl ether, methyl ethyl ether, diethyl ether, and methyl vinyl ether; cyclic ethers such as furan; ketones such as acetone; esters such as methyl acetate; and chlorinated hydrocarbons such as methyl chloride. The foaming agent may contain alcohols such as methanol and ethanol. Or, when the foaming agent is an unsaturated compound, a polymerization-inhibitor such as butylcatechol may be concurrently used. The foaming agent is used in a quantity of 2–50 parts, preferably 4–30 parts per 100 parts of the olefin polymer, the parts being by weight. The most preferred foaming agents are the hydrocarbons and ethers. Hydrocarbons are advantageous because they are cheap and easy of handling, and ethers are preferred in that since their effective degrees of expansion are extremely high, use of only minor quantities thereof is required. "Effective degree of expansion" is the ratio of the volume of foams contained in the cellular product of unit weight, to the volume to be occupied by the foaming agent in the quantity added to the unit weight of olefin polymer, as an ideal gas, in an atmosphere of 20° C. and 1 atmospheric pressure, expressed in percentile value. Normally effective degree of expansion is much less than 100%, probably due mainly to the phenomenon that a part of the foaming agent permeates through the olefin polymer membranes and escapes, during the period required for the solidification of the cellular product to acquire dimensional stability. Whereas, in case the ethers are used as the foaming agent, the effective degree of expansion can be generally improved by as much as approximately 25–40%, compared with the use of low boiling point hydrocarbons at the same mole concentration.

As the nucleating agent of the invention, either (a) finely divided, solid powder which does not melt at the heating temperature of the olefin polymer in the extruder, such as clay, diatomaceous earth, talc, and silica, or (b) one or more chemical foaming agents which decompose or chemically change at the heating temperature to generate gas. These nucleating agents are used in the amount of 0.05 to 2 parts per 100 parts of the olefin polymer, the parts being by weight.

As to the use of the nucleating agent, we discovered that the optimum result is obtained when an acidic alkali metal salt of a polyvalent carboxylic acid, which is one of the chemical foaming agents of group (b), and a carbonate or bicarbonate which is at least reactable with the foregoing acidic alkali metal salt at the heating temperature of the resin in the extruder, are added in a combined quantity of 0.05–2 parts, preferably 0.1–0.7 part, per 100 parts of the olefin polymer, the parts being by weight. The acidic alkali metal salts of the polyvalent carboxylic acids include: sodium hydrogentartrate, potassium hydrogen-succinate, monosodium citrate, monopotassium citrate, monosodium oxalate, etc. And, the carbonates or bicarbonates are those of alkali metals, alkaline earth metals and ammonium, such as sodium bicarbonate, sodium carbonate, ammonium bicarbonate, ammonium carbonate, potassium bicarbonate, potassium carbonate, calcium carbonate, etc.

Among the above nucleating agent, the combinations most suited for the purpose of this invention are those of monoalkali metal salts of citric acid with alkali metal salts of carbonic or bicarbonic acid. With mixtures of monohydrate of citric acid with sodium bicarbonate which have been widely used, the reaction between the two takes place at room temperature while the system is let stand. Whereas, the reaction between a monoalkali metal salt of citric acid and sodium bicarbonate exhibit any substantial progress only at temperatures above 130° C. Therefore the combination very effectively controls the foaming, when used in the systems for the preparation of low density or high density polyethylene foams. Again, the reaction between a monoalkali metal salt of citric acid and sodium carbonate substantially progresses at above 160° C. This combination therefore is well suited for the preparation of polypropylene foams.

In case a combination of a monalkali metal salt of citric acid and an alkali metal salt of carbonic acid is employed, it is preferred to use them at such a ratio that 28–83 parts of the latter is present per 100 parts of the former, and that 0.05–2 parts of the two are combined, per 100 parts of the olefin polymer, the parts being by weight. As to the combination of a monoalkali metal salt of citric acid with an alkali metal salt of bicarbonic acid, the preferred ranges of use is 44–132 parts of the latter per 100 parts of the former, and as a whole, 0.05–2 parts of the two as combined, per 100 parts of the olefin polymer, the parts being by weight.

Other preferred nucleating agent is a ternary mixture of (a) an acidic alkali metal salt of a polyvalent carboxylic acid, (b) a carbonate or bicarbonate which is reactable with at least the said acidic alkali metal salt at the heating temperature of the resin in the extruder, and (c) a monoglycelide of an aliphatic monocarboxylic acid of 8–20 carbons. In that case, satisfactory results can be obtained when 0.2–5 parts, preferably 1–3 parts, of the last (c) is used per part of (a) and (b) combined, and as the whole 0.1–4.0 parts, preferably 0.5–2.0 parts, of the ternary mixture is used per 100 parts of the olefin polymer, the parts being by weight.

The (a) acidic alkali metal salt of polyvalent carboxylic acid and (b) carbonate or bicarbonate are the same to those already described. Examples of (c) monoglycelide of aliphatic monocarboxylic acid of 8–20 carbons include, for example, monoglycelides of stearic, palmitic, oleic, and caprylic acids, etc.

We further discovered that, as a modification of the subject process, still better foamed products can be obtained by quenching the foamed products of this invention which are extruded into a low pressure zone from the die of the extruder, with a cooling medium consisting of a liquid and/or gas within 10 seconds, preferably 5 seconds, after the extrusion, and letting the products stand from several hours to several days to cause the phenomenon of later expansion.

The quenching can be performed either during the formation of the foamed products, or immediately after completion of the formation.

The effect of quenching is observable only when the foaming agents of this invention are applied to olefin polymers. During the standing of the quenched products for the following several hours to several days, the foamed products expand. This is referred to as the later expansion phenomenon, which presumably takes place as air enters into the cells at the state of reduced pressure after the preparation, through the cell membranes. The phenomenon is not entirely absent with closed-cellular products from other thermoplastic resins, but application of similar quenching to the preparation of polystyrene foams employing the foaming agents of this invention produced little difference in the later expansion of the foamed product. Not only that, the final product showed even a tendency to have a decreased degree of expansion, due to the shrinkage caused by the quenching.

Hereinafter the process of this invention will be further explained with reference to examples, it being understood that the scope of the invention is by no means restricted by the following examples. Unless otherwise indicated, the parts are by weight.

EXAMPLE 1

One hundred (100) parts of a high pressure process polyethylene, DFD–0111, produced by Nippon Unicar Co. (density: 0.923, melt index: 2.7) having a melting point of 110° C. as measured with a dilatometer was blended with 0.7 part of an equimolar mixture of monosodium citrate and sodium bicarbonate for 20 minutes by means of a ribbon blender, and thereafter fed into an extruder of 45 mm. $\phi$. In the extruder, the blend was heated temporarily to 170° C. so that the polyethylene was melted and monosodium citrate was reacted with sodium bicarbonate. Thereafter 8 parts of a pressurized hydrocarbon mixture of n-butane and iso-butane (mixing ratio=70:30) was fed into the extruder through the small holes bored in the extruder cylinder. While milling the content of the extruder, an oil was circulated through the external jacket of the extruder barrel as the cooling medium, in order to cool the molten composition in the extruder. The composition was then continuously extruded by inflation process while the resin temperature at the die exit was controlled to be 104–106° C. Thus obtained foamed polyethylene sheet was white and opaque, and had a beautiful appearance imparted by uniform and fine closed cells. Its density, degree of expansion and size of cells were as indicated as the results of run No. 7 in Table 1.

In order to evaluate the performance of the subject process, the results of extruding the identical compositions at temperatures above the melting point of the polyethylene are given as run Nos. 1 through 6 in the same table.

TABLE 1

| Run No. | Composition (parts) | | | Resin extruding temperature (° C.) | Properties of product | | |
|---|---|---|---|---|---|---|---|
| | DFD-0111 | Nucleating agent | Butane | | Density (g./cc.) | Degree of expansion (times) | Cell diameter (mm.) |
| 1 | 100 | 0.7 | 8 | 140 | 0.69 | 1.33 | |
| 2 | 100 | 0.7 | 8 | 135 | 0.68 | 1.35 | |
| 3 | 100 | 0.7 | 8 | 130 | 0.68 | 1.35 | |
| 4 | 100 | 0.7 | 8 | 125 | 0.60 | 1.53 | |
| 5 | 100 | 0.7 | 8 | 120 | 0.59 | 1.56 | |
| 6 | 100 | 0.7 | 8 | 115 | 0.54 | 1.70 | |
| 7 | 100 | 0.7 | 8 | 105 | 0.064 | 14.4 | 0.06–0.15 |

Degree of expansion are the values obtained by dividing the density of the polyethylene by density of the product.

From the results of Table 1, the conspicuous effect of the resin extruding temperature below melting point of the polyethylene on the resultant foaming can be understood. Also according to the subject process, the size of the cells in the multifoamed polyethylene is notably reduced.

EXAMPLE 2

One hundred (100) parts of the same high pressure process polyethylene DFD–0111 as employed in Example 1 was blended with 0.5 part of an equimolar mixture of monosodium citrate and sodium bicarbonate for 20 minutes in a ribbon blender. Then the mixture was fed into an extruder and temporarily heated to 170° C. similarly to Example 1. Then 12 parts of a pressurized hydrocarbon mixture consisting of propane, n-butane and iso-butane (mixing ratio=23:23:50) was fed into the system. The molten composition was extruded into an area of atmospheric pressure while the resin temperature at the exit of the end circular die was regulated to be 100–102° C. Thus produced multifoamed polyethylene had a density of 0.052 g./cc., and a degree of expansion of 17.8 times. The cells were uniform and fine, and 0.15–0.24 mm. in diameter.

EXAMPLE 3

One hundred (100) parts of a high pressure process polyethylene, DFDA 6775, produced by Nippon Unicar Co. (density: 0.919, melt index: 0.3) was blended with 0.5 part of an equimolar mixture of monosodium citrate and sodium bicarbonate for 20 minutes in a ribbon blender. The blend was fed into an extruder and temporarily heated to 180° C. Then 13 parts of a pressurized hydrocarbon mixture consisting of n-butane, iso-butane and butene-1 (mixing ratio=70:25:5) was added to the system. The molten composition was cooled by the means similar to Example 1, and extruded by inflation process while the resin temperature at the exit of end die was regulated to be 102–104° C. Thus obtained multifoamed polyethylene sheet of 1.5 mm. in thickness had a density of 0.045 g./cc., and a degree of expansion of 20.4 times. The foams were uniform and fine. Whereas, a foamed product formed by extruding the same composition at the resin temperature at the die exit of 117° C. had a high density of 0.51 g./cc., and degrees of expansion of 1.8 times.

EXAMPLE 4

One hundred (100) parts of Hizex 5000 F produced by Mitsui Petroleum Chemistry Co. (density: 0.955, melt index: 0.4) having a melting point of 132° C. as measured with a dilatometer, was blended with 0.7 part of an equimolar mixture of monosodium citrate and sodium bicarbonate for 20 minutes in a V-shaped blender. The blend was fed into an extruder, and heated temporarily to 200° C. Then 15 parts of a pressurized hydrocarbon mixture consisting of n-butane and iso-butane (mixing ratio=70:30) was fed into the extruder similarly to Example 1. The system was milled and cooled, and extruded into an area of atmospheric pressure while the resin temperature at the die exit was regulated to be 125° C. Thus obtained foamed product was white, opaque and somewhat rigid. Its density was 0.033 g./cc., and the degree of expansion was 28.9 times. The foams were composed substantially of closed cells, containing a minor part of open cells.

EXAMPLE 5

One hundred (100) parts of a low density polyethylene (density: 0.919, melting index: 0.3) having a melting point of 115° C. as measured with a dilatometer was blended with 0.15 part of monohydrate of citric acid and 0.3 part of sodium bicarbonate as the nucleating agent, for 15 minutes in a ribbon blender. The blend was fed into an extruder of 45 mm. $\phi$, and heated temporarily to 200° C. so that the polyethylene was melted and citric acid reacted with sodium bicarbonate. Then through the small holes bored in the extruder cylinder, 12 parts of a pressurized hydrocarbon mixture consisting of n-butane and iso-butane (mixing ratio=75:25) was injected into the system. While being milled the molten composition in the extruder was cooled by the oil which was circulated through the external jacket of the extruder barrel as a cooling medium, and extruded into an area of atmospheric pressure from the circular die at the end of the extruder. Thus multifoamed polyethylene sheet was produced by inflation process, while air was blown thereto.

The correlation between the resin extruding temperature at the die exit and die pressure, densities of the foamed polyethylenes, and other properties of the products are shown in Table 2 above.

TABLE 2

| Extruding conditions | | | Properties of foamed product | | | |
|---|---|---|---|---|---|---|
| Resin extruding temperature T (° C.) | Extruding pressure at die P (kg./cm.²) | −dP/dT (kg./cm.², ° C.) | Density (g./cc.) | Degree of expansion (times) | Cell size (mm.) | Appearance |
| 115 | 52 | | 0.37 | 2.5 | | Foams were partially broken. |
| 114 | 52 | | 0.31 | 3.0 | | Do. |
| 113 | 52 | | 0.24 | 3.8 | | Good. |
| 112 | 53 | | 0.18 | 5.1 | | Do. |
| 111 | 53 | | 0.14 | 6.7 | | Do. |
| 110 | 53 | | 0.11 | 8.4 | | Do. |
| 109 | 53 | | 0.097 | 9.5 | 0.5–1.0 | Do. |
| 108 | 53 | | 0.088 | 10.5 | 0.5–1.0 | Do. |
| 107 | 54 | | 0.079 | 11.7 | 0.5–1.0 | Do. |
| 106 | 54 | | 0.071 | 12.9 | 0.5–1.0 | Do. |
| 105 | 54 | | 0.065 | 14.1 | 0.5–1.0 | Do. |
| 104 | 55 | | 0.055 | 16.8 | 0.5–1.0 | Do. |
| 103 | 58 | 2.6 | 0.053 | 17.7 | 0.5–1.0 | Do. |
| 102 | 61 | 4.6 | 0.050 | 18.3 | 0.5–1.0 | Do. |
| 101 | 67 | 7.3 | 0.050 | 18.5 | 0.5–1.0 | Do. |
| 100 | 75 | 10.2 | 0.053 | 17.3 | 0.5–1.0 | A minor number of fish eyes were observed. |
| 99 | 90 | 18.0 | 0.057 | 16.2 | 0.5–1.0 | Do. |
| 98 | 122 | | 0.082 | 11.2 | 0.5–1.0 | Number of fish eyes increased. |

Note.—At 98.6° C., −dP/dT reached 20 kg./cm.², ° C.

EXAMPLE 6

One hundred (100) parts of the same polyethylene employed in Example 5 was blended with 0.5 part of talc and 0.5 part of diatomaceous earth as the nucleating agent for 15 minutes in a ribbon blender. The blend was fed in an extruder of 45 mm. $\phi$, and heated temporarily to 200° C. so that the polyethylene was melted. Then 18.5 parts of a pressurized hydrocarbon mixture consisting of n-butane and iso-butane (mixing ratio=70:30) was injected into the system through the small holes on the extruder. While being milled, the molten composition in the extruder was cooled by the oil which was circulated through the external jacket of the extruder barrel as a cooling medium, and extruded into an area of atmospheric pressure from the circular die attached to the end of the extruder while air was blown to the extrudate. Thus by inflation process, multifoamed polyethylene sheet was produced.

The correlation between the resin extruding temperature at the die exit and extruding pressure, and the properties of the multifoamed products obtained are shown in Table 3 below.

TABLE 3

| | Extruding conditions | | | Properties of foamed product | | | |
|---|---|---|---|---|---|---|---|
| Resin extruding temperature T (° C.) | Extruding pressure at die P (kg./cm.²) | −dP/dT (kg./cm.², ° C.) | Density (g./cc.) | Degree of expansion (times) | Cell size (mm.) | Appearance | |
| 115 | 30 | | 0.30 | 3.1 | | Foams were partially broken. | |
| 114 | 30 | | 0.26 | 3.9 | | Do. | |
| 113 | 30 | | 0.15 | 6.0 | 0.7–1.8 | Good closed cells. | |
| 112 | 30 | | 0.083 | 11.1 | 0.7–1.8 | Do. | |
| 111 | 30 | | 0.069 | 13.3 | 0.7–1.8 | Do. | |
| 110 | 30 | | 0.059 | 15.6 | 0.7–1.8 | Do. | |
| 109 | 30 | | 0.053 | 17.3 | 0.7–1.8 | Do. | |
| 108 | 30 | | 0.047 | 19.5 | 0.7–1.8 | Do. | |
| 107 | 30 | | 0.044 | 21.0 | 0.7–1.8 | Do. | |
| 106 | 30 | | 0.041 | 22.5 | 0.7–1.8 | Do. | |
| 105 | 31 | | 0.040 | 23.2 | 0.7–1.8 | Do. | |
| 104 | 31 | | 0.038 | 24.0 | 0.7–1.8 | Do. | |
| 103 | 31 | | 0.038 | 24.5 | 0.7–1.8 | Do. | |
| 102 | 32 | | 0.036 | 25.5 | 0.7–1.8 | Do. | |
| 101 | 32.5 | | 0.036 | 25.8 | 0.7–1.8 | Do. | |
| 100 | 33 | | 0.035 | 26.6 | 0.7–1.8 | Do. | |
| 99 | 33.5 | | 0.034 | 27.0 | 0.7–1.8 | Do. | |
| 98 | 34.5 | | 0.034 | 27.5 | 0.7–1.8 | Do. | |
| 97 | 36 | | 0.034 | 27.0 | 0.7–1.8 | Do. | |
| 96 | 37.5 | 2.3 | 0.034 | 27.3 | 0.7–1.8 | Do. | |
| 95 | 41 | 4.0 | 0.032 | 28.1 | 0.7–1.8 | Do. | |
| 94 | 47 | 7.0 | 0.035 | 26.1 | 0.7–1.8 | Do. | |
| 93 | 55 | 11.3 | 0.046 | 19.7 | 0.7–1.8 | Number of fish eyes were observed. | |
| 92 | 73 | 21.0 | 0.064 | 14.3 | 0.7–1.8 | Do. | |
| 91 | 98 | | 0.11 | 8.3 | 0.7–1.8 | Number of fish eyes increased. | |

NOTE.—At the extruding temperature of 92.2° C., −dP/dT became 20 kg./cm.², ° C.

EXAMPLE 7

Example 5 was repeated except that the combination of citric acid and sodium bicarbonate as the nucleating agent was replaced by monosodium citrate and sodium bicarbonate, and the resin extruding temperature at the die exit was controlled to be 102–103° C. The resultant foamed product was white and opaque, and had a beautiful appearance. Its density was 0.050–0.054 g./cc., and the degree of expansion was 17–18 times. The cells were 0.25–0.50 mm. in diameter.

EXAMPLE 8

One hundred (100) parts of the same polyethylene employed in Example 5 was blended with 0.7 part of an equimolar mixture of monosodium citrate and sodium bicarbonate for 15 minutes in a ribbon blender, and fed into an extruder of 45 mm. $\phi$. In the extruder the polyethylene was melted at 200° C. and the monosodium citrate was reacted with the sodium bicarbonate. Then 4 parts of a hydrocarbon mixture consisting of n-butane and isobutane (mixing ratio=70:30) was injected into the system through the small holes on the extruder. While being milled, the system was cooled externally of the extruder, and extruded into an area of atmospheric pressure from the circular die attached to the end of the extruder, while the resin temperature at the die exit was controlled to be 109–110° C. Blowing air against the extrudate, multifoamed polyethylene sheet was formed by inflation process.

The product was white and opaque, and had a beautiful appearance. Its density was 0.26 g./cc., degree of expansion was 3.6 times, and the foams were 0.2–0.40 mm. in diameter.

When the resin temperature at the die exit was lowered to 105° C., the product had a density of 0.34 g./cc. and a degree of expansion of 2.7 times. Probably due to the pulsation in the quantity of the extrudate, the thickness of the foamed product was uneven, and fish eyes were formed on the surfaces thereof.

EXAMPLE 9

One hundred (100) parts of the same polyethylene employed in Example 5 was blended with 0.1 part of an equimolar mixture of monosodium citrate and sodium bicarbonate as the nucleating agent, for 15 minutes in a ribbon blender, and fed into an extruder of 45 mm. $\phi$. The blend was heated temporarily to 200° C. so that the polyethylene was melted and the monosodium citrate was reacted with sodium bicarbonate. Then through the small holes on the extruder, 24 parts of a hydrocarbon mixture consisting of n-butane and isobutane (mixing ratio=70:30) was injected into the system. While being milled, the system was cooled externally of the extruder, and extruded into an area of atmospheric pressure from the circular die attached to the end of extruder. In the meantime, the resin temperature at the die exit was controlled to be 90° C. Blowing air against the extrudate, multifoamed polyethylene sheet was produced by inflation process.

The product had a density of 0.026 g./cc., and a degree of expansion of 35 times. The smoothness of its surface was somewhat inferior.

EXAMPLE 10

One hundred (100) parts of a low density polyethylene (density: 0.919, melt index: 0.3) having a melting point of 115° C. as measured with a dilatometer, and 0.3 part of an equimolar mixture of monosodium citrate and sodium bicarbonate as the nucleating agent were fed into an extruder of 45 mm. $\phi$, and heated temporarily to 200° C. Thereupon the polyethylene was melted and the components of the nucleating agent were reacted. Then 10.7 parts of pressurized dimethyl ether per 100 parts of the polyethylene was injected into the molten composition through the small holes provided in the cylinder. While being milled, the system was externally cooled, and extruded into an area of atmospheric pressure from the circular die, while the resin temperature at the die exit was maintained at 101–102° C. Blowing air against the extrudate, multifoamed polyethylene sheet was prepared by inflation process.

The product had uniform, beautiful appearance, and had a density of 0.043 g./cc. and degree of expansion of 21.4 times.

EXAMPLE 11

Example 10 was repeated except that the resin temperature at the die exit was lowered to 98° C., at which point the temperature gradient of the extruding pressure $-dP/dT$ became 20 (kg./cm.$^2$. ° C.). The resultant multifoamed polyethylene sheet was noticeably uneven in thickness, and a large number of fish eyes were observed on the surface thereof. Thus the appearance was definitely inferior, but the product had a density of 0.11 g./cc. and degree of expansion of 8.4 times.

EXAMPLE 12

Example 10 was repeated except that the extrusion was performed at the resin temperature at the die exit of 115° C. Observation of thus obtained multifoamed polyethylene sheet revealed that the product contained partially open cells. Its density was 0.36 g./cc., and the degree of expansion was 2.6 times.

EXAMPLE 13

One hundred (100) parts of the same polyethylene as employed in Example 10 was added with 0.1 part of an equimolar mixture of monosodium citrate and sodium bicarbonate as the nucleating agent. The blend was fed into an extruder of 45 mm. φ, and heated temporarily to 200° C. Thus the polyethylene was melted and the components of the nucleating agent were reacted. Then 17.3 parts of pressurized dimethyl ether per 100 parts of the polyethylene was injected into the molten composition, through the small holes bored in the cylinder. While being milled, the system was externally cooled and extruded into an area of atmospheric pressure from a tapered circular die. Blowing air against the extrudate, multifoamed polyethylene sheets were prepared by inflation process.

The density and appearance of the products differed, depending on the resin extruding temperature, as indicated in Table 4 below.

TABLE 4

| Resin extruding temperature T (° C.) | Density (g./cc.) | Degree of expansion (times) | Appearance |
|---|---|---|---|
| 115 | 0.24 | 3.8 | Foams are partially broken. |
| 110 | 0.072 | 12.8 | Good. |
| 105 | 0.038 | 24.5 | Do. |
| 100 | 0.029 | 32.1 | Do. |
| 95 [1] | 0.050 | 18.5 | A very minor number of fish were observed. |

[1] $-dP/dT=9.0$.

EXAMPLE 14

One hundred (100) parts of a crystalline ethylenevinyl acetate copolymer (ethylene content: 95%, density: 0.926, melt index: 0.5) having a melting point of 106–107° C. as measured with a dilatometer was added with 0.3 part of an equimolar mixture of monosodium citrate and sodium bicarbonate. The composition was fed into an extruder and heated temporarily to 180° C. Thus the polyethylene was melted and the monosodium citrate was reacted with sodium bicarbonate. Then 11.7 parts of pressurized propane per 100 parts of the copolymer was injected into the molten composition through the small holes bored in the cylinder. The system was cooled externally while being milled, and extruded into an area of atmospheric pressure from a circular die, while the resin temperature at the die exit was maintained at 92–93° C. Blowing air against the extrudate, multifoamed sheet was prepared by inflation process.

The product consisted of uniform, closed cells and had a beautiful appearance. Its density was 0.052 g./cc., and the degree of expansion was 17.7 times.

EXAMPLE 15

Example 5 was repeated except that 100 parts of the polyethylene was blended with 5 parts of butyl rubber by means of heated rolls. The product had a density of 0.049 g./cc. and degree of expansion of 18.8 times.

EXAMPLE 16

Example 5 was repeated except that 100 parts of the polyethylene was blended with 5 parts of butadiene rubber by means of heated rolls. The product had a density of 0.052 g./cc., and degree of expansion of 17.7 times.

EXAMPLE 17

One hundred (100) parts of a polypropylene (density: 0.91, melt index: 2.0 as measured at 230° C.) having a melting point of 170° C. as measured with a dilatometer (rate of temperature rise: 1° C./min.) was blended with 0.2 part of an equimolar mixture of monosodium citrate and sodium carbonate, for 15 minutes in a ribbon blender. The blend was fed into an extruder of 45 mm.φ, and heated temporarily to 230° C. so that the polypropylene was melted and the components of the nucleating agent were reacted. Then 17.3 parts of a hydrocarbon mixture consisting of n-butane and iso-butane (mixing ratio =70:30) was injected into the molten composition to be milled therewith, through the small holes bored in the extruder barrel. The system was cooled externally while being milled, and extruded into an area of atmospheric pressure from the circular die attached to the end of the extruder. Thus multifoamed polypropylene sheet was prepared.

The correlations between the resin extruding temperature at the die exit, and the density and degree of expansion of the product are shown in Table 5 below.

TABLE 5

| | Foamed product | |
|---|---|---|
| Resin extruding temperature T (° C.) | Density (g./cc.) | Degree of expansion (times) |
| 170 | 0.414 | 2.2 |
| 165 | 0.202 | 4.5 |
| 160 | 0.132 | 6.9 |
| 155 | 0.078 | 11.2 |
| 150 | 0.048 | 19.1 |
| 145 | 0.042 | 21.8 |
| 140 | 0.034 | 26.8 |
| 137 ($-dP/dT=20$) | 0.037 | 20.5 |
| 136.5 ($-dP/dP=35$) | 0.113 | 8.2 |

EXAMPLE 18

Example 17 was repeated except the mixed foaming agent of n-butane and iso-butane was replaced by n-pentane, and the nucleating agent was replaced by 0.5 part of azodicarbonamide. The composition was extruded at 140° C. The product had a density of 0.103 g./cc., and degree of expansion of 8.8 times.

When the quantity of n-pentane was further increased to 28.0 parts and 42.0 parts each to 100 parts of the polypropylene, the densities of the products were, respectively, 0.073 g./cc. and 0.051 g./cc., and the degrees of expansion were 12.5 times and 18.0 times.

EXAMPLE 19

Example 17 was repeated except that n-hexane was used as the foaming agent. Extruding the composition at the resin temperature at the die exit of 140° C., a multifoamed polypropylene sheet was prepared, which had a density of 0.24 g./cc. and degree of expansion of 3.8 times.

EXAMPLE 20

One hundred (100) parts of a low density polyethylene (density: 0.918, melt index: 2.0) having a melting point of 113° C. as measured with a dilatometer (rate of temperature rise: 1° C./min.) was fed into an extruder of 45 mm. φ, together with 0.3 part of an equimolar mixture of monosodium citrate and sodium bicarbonate as the nucleating agent. The system was heated in the extruder temporarily to 180° C. so that the polyethylene was melted and the components of the nucleating agents were reacted. Then 11 parts of pressurized dimethyl ether per 100 parts of the polyethylene was injected into the molten composition through the small holes bored in the extruder cylinder. The system was cooled externally while being milled, and continuously extruded into an area of atmospheric pressure by inflation process. During the extrusion, the resin temperature at the exit of the end die was regulated to be 96°–100° C. Thus obtained multifoamed polyethylene sheet was composed of uniform, fine closed cells. As a whole, it was white and opaque, and had a beautiful appearance. The product's density was 0.037 g./cc., and effective degree of expansion of the foaming agent was 45%.

In order to evaluate the performance of the subject process, the above procedures were repeated except that 10.6 parts of propane per 100 parts of the polyethylene was used as the foaming agent. The product had a density of 0.051 g./cc., and the effective degree of expansion of the foaming agent was 32%.

EXAMPLE 21

One hundred (100) parts of a low density polyethylene (density: 0.919, melt index: 0.3) having a melting point of 115° C. as measured with a dilatometer (rate of temperature rise: 1° C./min.) was fed into an extruder of 45 mm. φ, together with 0.3 part of an equimolar mixture of monosodium citrate and sodium bicarbonate, as the nucleating agent. The system in the extruder was temporarily heated to 200° C. so that the polyethylene was melted and the monosodium citrate was reacted with sodium bicarbonate. Then 12 parts of pressurized methyl ethyl ether per 100 parts of the polyethylene was injected into the molten composition through the small holes bored in the cylinder. The system was then cooled externally while being milled, and thereafter continuously extruded into an atmosphere of normal pressure by inflation process. During the extrusion, the resin temperature at the exit of the end die was regulated to be 100–104° C. Thus obtained multifoamed polyethylene sheet was composed of uniform, fine and closed cells, and as a whole had a white, opaque, beautiful appearance. The product had a density of 0.045 g./cc., and effective degree of expansion of the foaming agent was 44%.

In order to evaluate the performance of the subject process, the above procedures were repeated except that 11.6 parts of butane per 100 parts of the polyethylene was used as the foaming agent. The multifoamed product had a density of 0.059 g./cc., and effective degree of expansion of the foaming agent was 35%.

EXAMPLE 22

One hundred (100) parts of a low density polyethylene (density: 0.919, melt index: 0.3, melting point: 115° C.) was blended with 0.09 part of monosodium citrate, 0.07 part of sodium bicarbonate, and 0.5 part of monoglyceride stearate. The blend was fed into an extruder of 45 mm. φ, and heated temporarily to 200° C. Then 9 parts of pressurized butane per 100 parts of the polyethylene was injected into the molten composition. The system was cooled externally while being milled, and thereafter extruded by inflation process. During the extrusion, the resin temperature at the exit of the end die was regulated to be 102–104° C. Thus obtained multifoamed sheet had a density of 0.064 g./cc., and the greatest majority of the cells were less than 0.25 mm. in diameter, fine and uniform. The product had a white, opaque, beautiful appearance and was rich in elasticity.

EXAMPLE 23

Example 22 was repeated except that the monosodium citrate was replaced by sodium hydrogentartrate. The result was quite similar to that of Example 22.

EXAMPLE 24

Example 22 was repeated except that the monoglyceride stearate was replaced by monoglyceride oleate. The result was quite similar to that of Example 22.

EXAMPLE 25

One hundred (100) parts of a high density polyethylene (density: 0.955, melt index: 0.3, melting point: 132° C.) was blended with 0.28 part of monosodium citrate, 0.13 part of sodium carbonate, and 0.4 part of monoglyceride stearate. The blend was fed into an extruder of 45 mm. φ, and heated temporarily to 220° C. Then 18 parts of pressurized butane was injected into the molten composition, to be milled therewith. During the milling, the system was cooled externally, and extruded by inflation process while the resin temperature at the exit of end die was regulated to be 125–128° C. Thus obtained white, opaque and elastic multifoamed product had a density of 0.037 g./cc., and was composed of uniform and fine cells, most of which being less than 0.25 mm. in diameter.

REFERENCE 1

To the same low density polyethylene as employed in Example 22, a binary mixture of sodium bicarbonate (0.07 part) and monoglyceride stearate (0.5 part) was added, and the composition was subjected to the procedures as described in Example 22. Thus obtained multifoamed sheet had a density of approximately 0.069 g./cc., but the foam sizes were markedly uneven and much greater than those in the products of Examples 22–25. The average diameter of the cells was more than 1.0 mm.

REFERENCE 2

Example 22 was repeated except that in the ternary nucleating agent, sodium bicarbonate was omitted. The resultant multifoamed sheet had a density of approximately 0.067 g./cc., but the cell sizes were markedly uneven and much greater than those in the products of Examples 22–25. The average diameter of the cells was more than 0.70 mm.

EXAMPLE 26

One hundred (100) parts of a low density polyethylene (density: 0.919, melt index: 0.3; melting point: 115° C.) was fed into an extruder of 45 mm. φ, together with 0.5 part of an equimolar mixture of monosodium citrate and sodium bicarbonate. The system was temporarily heated to 200° C. in the extruder, so that the polyethylene was melted and the components of the nucleating agent were reacted. Then 10 parts of a pressurized butane mixture (n-butane:iso-butane=70:30) was injected into the molten composition through the small holes bored in the cylinder. The system was cooled externally while being milled, and continuously extruded into an area of atmospheric pressure from the circular die. During the extrusion, the resin temperature at the exit of the end die was regulated to be 102–108° C. Thus molded foamed product was quenched with water approximately 1–2 seconds after the extrusion. The obtained multifoamed polyethylene sheet was white and opaque, had a beautiful appearance, and contained uniform and fine cells. The densities of the products immediately after the preparation and 10 days thereafter, and the degree of expansion measured at the latter occasion are shown in Table 6, as run Nos. 2–6.

Run No. 1 is the reference, in which the same composition extruded as in the above was not quenched.

TABLE 6

| Run number | Composition (parts) | | | Quenching | Density of product (g./cc.) | | Degree of later expansion (percent) |
| --- | --- | --- | --- | --- | --- | --- | --- |
| | Low density polyethylene | Nucleating agent | Butane | Temperature of quenching water (° C.) | Immediately after preparation | Ten days after preparation | |
| 1 | 100 | 0.5 | 10 |  | 0.120 | 0.107 | 12 |
| 2 | 100 | 0.5 | 10 | 5 | 0.104 | 0.046 | 126 |
| 3 | 100 | 0.5 | 10 | 20 | 0.098 | 0.043 | 128 |
| 4 | 100 | 0.5 | 10 | 40 | 0.099 | 0.045 | 120 |
| 5 | 100 | 0.5 | 10 | 60 | 0.095 | 0.046 | 106 |
| 6 | 100 | 0.5 | 10 | 80 | 0.093 | 0.047 | 98 |

EXAMPLE 27

Example 26 was repeated except that the extrudate was quenched immediately after the extrusion with air, or spray consisting of air and water. The densities of the products immediately after the preparation and 10 days thereafter, as well as the degree of later expansion, are shown in Table 7 below.

REFERENCE 3

One hundred (100) parts of a low density polyethylene (density: 0.919, melt index: 0.3, melting point: 115° C.) was blended with 0.5 part of an equimolar mixture of monosodium citrate and sodium bicarbonate, and 5 parts of azodicarbonamide (azobis CA, Hikari Kasei Co.). The blend was fed into the same extruder as employed in Ex-

TABLE 7

| Run number | Composition | | | Quenching | | Density of product (g./cc.) | | Degree of later expansion (percent) |
| --- | --- | --- | --- | --- | --- | --- | --- | --- |
| | Low density polyethylene | Nucleating agent | Butane | Quenching medium | Temperature of quenching medium (° C.) | Immediately after preparation | Ten days after preparation | |
| 7 | 100 | 0.5 | 10 | Air | Room temperature | 0.111 | 0.052 | 113 |
| 8 | 100 | 0.5 | 10 | Air-water spray | do | 0.112 | 0.050 | 124 |

EXAMPLE 28

One hundred (100) parts of a polypropylene (density: 0.905, melting point: 170° C.) was blended with 0.5 part of an equimolar mixture of monosodium citrate and sodium carbonate. The blend was fed into the same extruder employed in Example 26, and heated temporarily to 220° C. Then 20 parts of a pressuriezd butane-n-pentane mixture (mixing ratio=2:1) was fed into the molten composition to be milled therewith. After the milling, the composition was extruded at 150–160° C., and formed into three types of foamed products as follows:

Run No. 15 _____ Not quenched.
Run No. 16 _____ Quenched with air immediately after extrusion.
Run No. 17 _____ Quenched with water 1–2 seconds after extrusion.

ample 26, and heated temporarily to 210° C. Then the system was cooled externally of the cylinder and extruded from a circular die at 130–140° C. Three types of foamed products were formed as follows:

Run No. 9 _____ Not quenched.
Run No. 10 _____ Quenched with air immediately after extrusion.
Run No. 11 _____ Quenched with water 1–2 seconds after extrusion.

The products contained partially open cells and had poor surface property. Their densities immediately after the preparation and 10 days thereafter, as well as their degrees of later expansion, were as shown in Table 9.

The results clearly indicate that when the foaming was caused by chemical foaming agent, the products had relatively high densities, and little difference was observed in their degree of later expansion.

TABLE 9

| Run number | Composition (parts) | | | | Quenching medium | Density of product (g./cc.) | | Degree or later expansion (percent) |
| --- | --- | --- | --- | --- | --- | --- | --- | --- |
| | Low density polyethylene | Nucleating agent | Azobis CA | | | Immediately after preparation | Ten days after preparation | |
| 9 | 100 | 0.5 | 5 | |  | 0.33 | 0.29 | 14 |
| 10 | 100 | 0.5 | 5 | | Air (room temperature) | 0.31 | 0.26 | 19 |
| 11 | 100 | 0.5 | 5 | | Water (room temperature) | 0.27 | 0.24 | 12 |

The products contained white, opaque and closed cells at high degrees of expansion. By the quenching, degree of expansion was markedly increased, and consequently density of the final product was reduced. The results are shown in Table 8.

REFERENCE 4

One hundred (100) parts of a polystyrene resin (density: 1.05, Vicat softening point 97° C.) was blended with 0.5 part of an equimolar mixture of monosodium

TABLE 8

| Run number | Composition (parts) | | | Quenching medium | Density of product (g./cc.) | | Degree of later expansion (percent) |
| --- | --- | --- | --- | --- | --- | --- | --- |
| | Polypropylene | Nucleating agent | Butane-n-pentane | | Immediately after preparation | Ten days after preparation | |
| 15 | 100 | 0.5 | 20 |  | 0.072 | 0.057 | 29 |
| 16 | 100 | 0.5 | 20 | Air (room temperature) | 0.068 | 0.032 | 112 |
| 17 | 100 | 0.5 | 20 | Water (room temperature) | 0.067 | 0.028 | 130 | citrate and sodium bicarbonate. The blend was fed into the same extruder as employed in Example 26, and into which 7 parts of a pressurized butane mixture (n-butane:isobutane=70:30) was added. The system was then extruded at 110–120° C., and formed into three types of foamed products as follows:

Run No. 12 ____ Not quenched.
Run No. 13 ____ Quenched with air immediately after extrusion.
Run No. 14 ____ Quenched with water 1–2 seconds after extrusion.

The products were white and opaque, and had beautiful appearances. Little difference was observed in the products as to the density variation due to quenching and the degree of later expansion. The results were as shown in Table 10 below.

TABLE 10

| Run number | Composition (parts) | | | | Density of product (g./cc.) | | Degree of later expansion (percent) |
|---|---|---|---|---|---|---|---|
| | Polystyrene | Nucleating agent | Butane | Quenching medium | Immediately after preparation | Ten days after preparation | |
| 12 | 100 | 0.5 | 7 | | 0.103 | 0.092 | 12 |
| 13 | 100 | 0.5 | 7 | Air (room temperature) | 0.097 | 0.084 | 15 |
| 14 | 100 | 0.5 | 7 | Water (room temperature) | 0.131 | 0.120 | 9 |

What is claimed is:

1. A process for the preparation of a substantially closed-celled, foamed shaped product of an olefin polymer, comprising
    (1) contacting, in a melt extruder, a molten crystalline, substantially linear olefin polymer containing at least 80 mol percent of monomer units of at least one olefin of 2 to 6 carbon atoms, 2 to 50 parts by weight, per 100 parts by weight of said polymer, of a pressurized foaming agent comprising a normally gaseous or liquid material having a boiling point of −45° C. to +70° C. and selected from aliphatic hydrocarbons of up to 4 carbon atoms, cycloaliphatic hydrocarbons of 3–4 carbon atoms, aliphatic ethers of 2–4 carbon atoms, furan, acetone, methyl acetate and methyl chloride, and a nucleating agent selected from the group consisting of
        (a) a mixture of (i) an acidic alkali metal salt of citric acid and (ii) a carbonate or bicarbonate which is capable of reacting with said acidic alkali metal salt at the temperature of the polymer in the extruder; and
        (b) a mixture of (a) and (iii) a monoglyceride of an aliphatic monocarboxylic acid of 8–20 carbon atoms;
    (2) cooling the blend of polymer, foaming agent and nucleating agent formed in (1) in the extruder to a temperature which is at least 2° C. lower than the melting point of said polymer and which is not lower than the temperature at which $dP/dT$ becomes 20 (kg./cm.$^2 \cdot$ °C.), T being the temperature of the blend at the extruding die of the extruder, and P being the extruding pressure (kg./cm.$^2$) of the blend at said die; and
    (3) thereafter extruding said blend at the temperature to which the blend is cooled in (2) into a zone at a lower pressure than that of the extruder.

2. The process of claim 1 wherein the ratio of the foaming agent to the polymer is 4–30 parts by weight of the foaming agent to 100 parts by weight of the polymer, and said blend in the extruder is cooled to a temperature at least 5° C. lower than the melting point of said polymer.

3. The process of claim 1, wherein 0.05–2 parts by weight of said nucleating agent per 100 parts by weight of said polymer are added.

4. The process of claim 1, wherein a monoalkali metal salt of citric acid and an alkali metal salt of carbonic acid are used as said nucleating agent at such ratios that 28–83 parts by weight of the latter is present per 100 parts by weight of the former, and the two are added to said blend at such ratios that the combined quantity of the two is 0.05–2 parts by weight per 100 parts by weight of the polymer.

5. The process of claim 1, wherein a monoalkali metal salt of citric acid and an alkali metal salt of bicarbonic acid are used as the nucleating agent, at such ratios that 44–132 parts by weight of the latter is present per 100 parts by weight of the former, and the two are added to said blend at such a ratio that the combined quantity of the two is 0.05–2 parts by weight per 100 parts by weight of the polymer.

6. The process of claim 1 wherein 0.2–5 parts by weight of (c) is used per 1 part by weight of the combined weight of (i) and (ii).

7. The process of claim 1, wherein said polymer is selected from the group consisting of
    (a) crystalline and substantially linear homopolymers of α-olefins of 2–6 carbon atoms,
    (b) crystalline and substantially linear copolymers of at least two of the above α-olefins,
    (c) crystalline and substantially linear copolymers of the α-olefins with other polymerizable, unsaturated compounds, the α-olefin content of monomer units of each copolymer being at least 80 mol percent,
    (d) blends of above (a) and (b),
    (e) blends of (a) or (b) with (c) above, the α-olefin content of monomer units of each blend being at least 80 mol percent,
    (f) blends comprising at least one of the above (a), (b), and (c) and natural or synthetic rubber, the α-olefin content of monomer units of each blend being at least 80 mol percent.

8. The process of claim 1 wherein the foamed shaped product obtained by extruding the blend from the die of the extruder into a low pressure zone is quenched within 10 seconds, from the extrusion.

9. The process of claim 1 wherein the foaming agent is selected from the group consisting of said hydrocarbons and ethers.

References Cited
UNITED STATES PATENTS

| 2,987,774 | 6/1961 | Jacobson | 264—53 |
| 3,067,147 | 12/1962 | Rubens et al. | 264—53 |
| 3,026,272 | 3/1962 | Rubens et al. | 264—53 |
| 3,072,584 | 1/1963 | Karpovich | 264—53 |
| 3,151,192 | 9/1964 | Jacobs et al. | 264—53 |
| 3,344,215 | 9/1967 | De Witz et al. | 264—53 |
| 3,407,151 | 10/1968 | Overcashier | 260—2.5 |
| 3,658,973 | 4/1972 | Aykanian | 260—2.5 |

DONALD E. CZAJA, Primary Examiner

E. C. RZUCIDLO, Assistant Examiner

U.S. Cl. X.R.

260—2.5 E; 264—51, 54

UNITED STATES PATENT OFFICE
CERTIFICATE OF CORRECTION

Patent No. 3,808,300         Dated   April 30, 1974

Inventor(s)     AKIRA MIYAMOTO ET AL

It is certified that error appears in the above-identified patent and that said Letters Patent are hereby corrected as shown below:

Column 20, Claim 6, line 2 thereof: cancel "(c)" and substitute therefor -- (iii) --

Signed and sealed this 10th day of September 1974.

(SEAL)
Attest:

McCOY M. GIBSON, JR.
Attesting Officer

C. MARSHALL DANN
Commissioner of Patents